US008090870B2

(12) United States Patent
Liu et al.

(10) Patent No.: US 8,090,870 B2
(45) Date of Patent: Jan. 3, 2012

(54) METHOD AND SYSTEM FOR ADAPTIVE DATA TRANSFER OVER PACKET NETWORKS

(75) Inventors: Howard Liu, San Marino, CA (US); Ken Long, Burbank, CA (US); Sheldon Shen, Arcadia, CA (US)

(73) Assignee: Disney Enterprises, Inc., Burbank, CA (US)

( * ) Notice: Subject to any disclaimer, the term of this patent is extended or adjusted under 35 U.S.C. 154(b) by 39 days.

(21) Appl. No.: 12/381,028

(22) Filed: Mar. 5, 2009
(Under 37 CFR 1.47)

(65) Prior Publication Data
US 2009/0271513 A1    Oct. 29, 2009

Related U.S. Application Data

(60) Provisional application No. 61/125,831, filed on Apr. 28, 2008.

(51) Int. Cl.
G06F 15/16    (2006.01)
G06F 15/173    (2006.01)
G06F 11/00    (2006.01)
H03M 13/00    (2006.01)

(52) U.S. Cl. ........ 709/239; 709/238; 709/231; 709/242; 714/751; 714/779; 370/232; 370/237; 370/238

(58) Field of Classification Search .......... 709/223–224, 709/238–244, 246, 231; 370/231–236, 237, 370/238; 714/752, 751, 774, 779, 786–796
See application file for complete search history.

(56) References Cited

U.S. PATENT DOCUMENTS

| 6,411,946 | B1 * | 6/2002 | Chaudhuri | 706/21 |
|---|---|---|---|---|
| 6,907,000 | B1 * | 6/2005 | Host | 370/228 |
| 6,981,055 | B1 * | 12/2005 | Ahuja et al. | 709/238 |
| 7,313,630 | B1 * | 12/2007 | Nucci et al. | 709/241 |
| 7,406,539 | B2 * | 7/2008 | Baldonado et al. | 709/240 |
| 7,502,324 | B1 * | 3/2009 | Tieu | 370/235 |
| 7,548,937 | B2 * | 6/2009 | Gu et al. | 709/233 |
| 7,567,577 | B2 * | 7/2009 | Thubert et al. | 370/401 |
| 7,596,811 | B2 * | 9/2009 | Lloyd et al. | 726/24 |
| 7,620,053 | B2 * | 11/2009 | MeLampy et al. | 370/395.31 |
| 7,633,887 | B2 * | 12/2009 | Panwar et al. | 370/254 |
| 7,697,438 | B2 * | 4/2010 | Ji et al. | 370/238 |
| 2002/0078237 | A1 * | 6/2002 | Leighton et al. | 709/239 |
| 2006/0015927 | A1 * | 1/2006 | Antonellis et al. | 725/145 |
| 2009/0106451 | A1 * | 4/2009 | Zuckerman et al. | 709/239 |

OTHER PUBLICATIONS

Clark, J. A. et al, "Practical Digital Cinema Distribution in an Evolving Technology Environment", Broadcastpapers.com, Sep. 7, 2001. pp. 1-9.*

* cited by examiner

*Primary Examiner* — Gregory Todd
(74) *Attorney, Agent, or Firm* — Farjami & Farjami LLP

(57) ABSTRACT

There is provided a method for adaptive data transfer over packet networks. The method comprises selecting a first communication path for transferring the data to the second computer, starting to transfer the data over the first communication path to the second computer, monitoring transfer characteristics of the first communication path related to the data transfer, storing the transfer characteristics associated with the first communication path in a database, comparing the transfer characteristics against one or more previously stored transfer characteristics related to one or more prior data transfers, and determining whether to alter a transfer algorithm being utilized for transferring the data to the second computer based on the comparing.

17 Claims, 2 Drawing Sheets

METHOD AND SYSTEM FOR ADAPTIVE DATA TRANSFER OVER PACKET NETWORKS

RELATED APPLICATIONS

This application claims priority to U.S. Provisional Application No. 61/125,831, filed on Apr. 28, 2008, which is hereby incorporated by reference in its entirety.

BACKGROUND OF THE INVENTION

1. Field of the Invention

The present invention relates generally to data communication. More particularly, the present invention relates to data transfer over packet networks.

2. Background Art

Packet-switched networks such as the Internet are widely used to transfer data. By themselves, such networks typically provide for simple communication between network hosts. This simplicity, while helping to spur the rapid, global adoption of packet-switched networks, comes at the price of reduced reliability. Thus, messages transmitted between network hosts are not guaranteed by the underlying packet-switched network to arrive in order, on time, or at all. Packets might be reordered or dropped because of bandwidth contention or line error, leading to a loss of throughput. In response to these shortcomings, higher-level protocols have been created that operate in conjunction with the underlying packet-switched network to alleviate particular problems.

For example, the higher-level protocols UDP and TCP were designed to make additional facilities available to network hosts communicating on a packet-switched network. Using UDP, hosts can accomplish checksumming and application-specific message multiplexing, while using TCP, hosts can rely on certain message-delivery and message-ordering guarantees. UDP is generally less reliable than TCP, and TCP, initially specified in the 1970s, assumes certain network traffic behaviors that are suitable for only certain types of data transfers.

Data transfer systems implemented with conventional higher-level protocols can still experience the loss of throughput associated with bandwidth contention, because bandwidth contention happens at the lower packet-switched network level. Bandwidth contention occurs when two or more network hosts attempt, knowingly or not, to use the same path through the packet-switched network at the same time. When these attempts are made, packets from each application may interfere with each other at intermediate routers in the packet switched network. Where the packets interfere, they must take turns, usually by waiting in a router packet queue, which imposes a delay. During high traffic conditions, this contention will lead to decreased throughput, and as the traffic increases, dropped packets. Packets can be dropped when a router is finally overwhelmed by traffic, and has a full queue.

Data transfer systems implemented with conventional higher-level protocols can also still experience the loss of throughput associated with line error, because line error happens at or below the packet-switched network level. Line error can occur whether or not a particular path through a packet-switched network is experiencing any bandwidth contention, and instead usually involves equipment failure. One example of equipment failure is caused by power outage or software crash on a router, resulting in an entire queue's worth of packets dropped. Another example of equipment failure is caused by a transmission line being physically severed. In this case, all packets transmitted on the line are dropped until the line is repaired.

Higher-level protocols have made some inroads into dealing with the unreliability of packet-switched networks, but they cannot effectively avoid the lost throughput caused by bandwidth contention and line errors, so as to maintain an acceptable or reliable data transfer rate or data throughput. Accordingly, there is a need to overcome the drawbacks and deficiencies in the art by providing an improved method or system for transferring data over packet-switched networks.

SUMMARY OF THE INVENTION

There are provided methods and systems for adaptive data transfer over packet networks, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
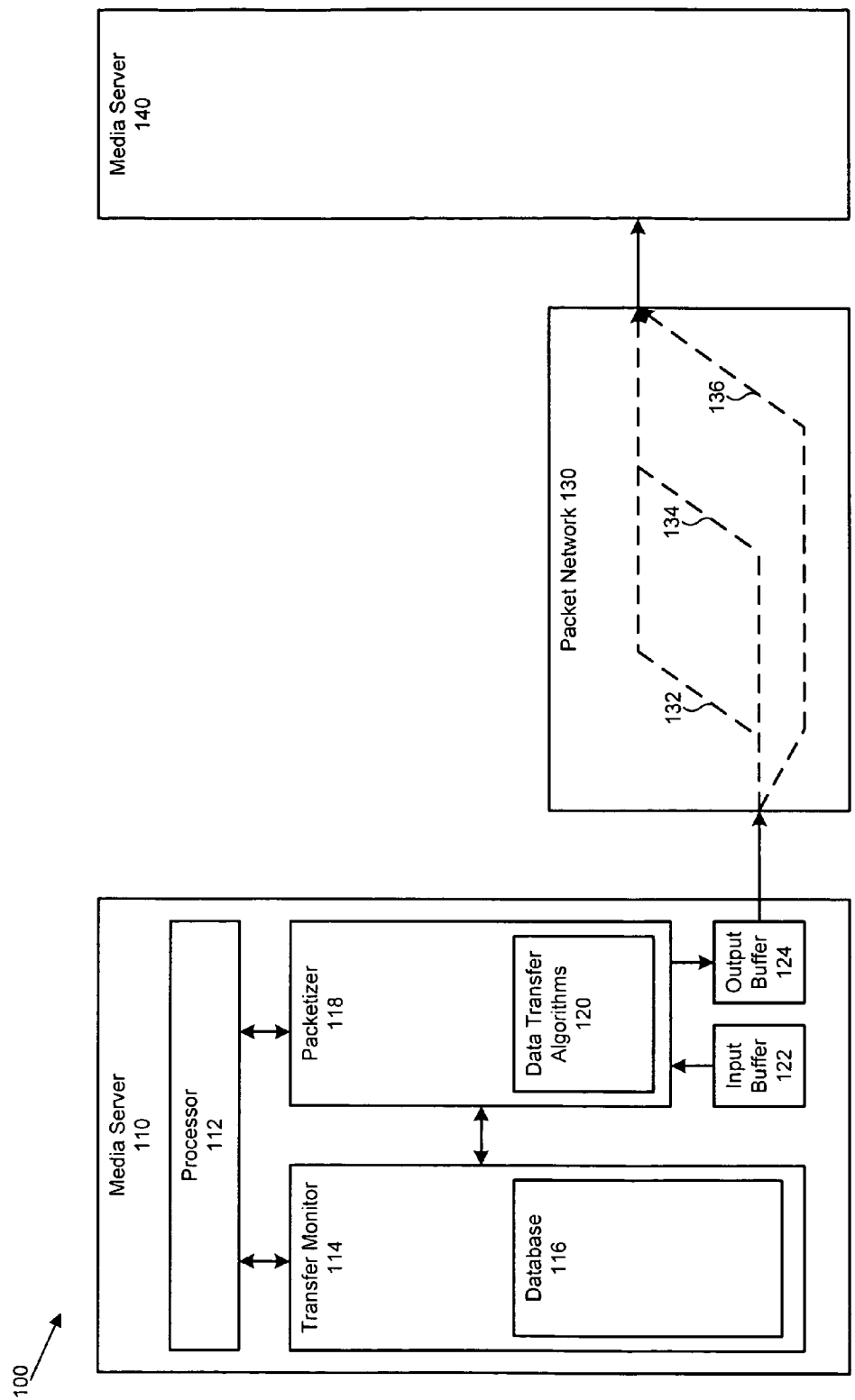
FIG. 1 shows a diagram of an exemplary system for adaptive data transfer over a packet network, according to one embodiment of the present invention.

The present application is directed to a method and system for adaptive data transfer over packet networks. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

FIG. 1 shows communication system 100 for adaptive data transfer over a packet network, according to one embodiment of the present invention. As shown, system 100 includes media servers 110 and 140 and packet network 130. Media server 110, which may be a computer, comprises processor 112, transfer monitor 114, packetizer 118, input buffer 122, and output buffer 124. Transfer monitor 114 comprises database 116, and packetizer 118 comprises data transfer algorithms 120. During a data transfer, processor 112 executes transfer monitor 114 and packetizer 118, which may be processes in a memory of media server 110. Media server 110 may send data to media server 140 via packet network 130, which comprises a plurality of communication paths including communication paths 132, 134, and 136. Media server

140 may include internal components similar to those of media server 110, or may be a passive server configured only to receive files.

Media server 110 may be configured to store data to be transferred in a local hard drive (not shown), or media server 110 may instead receive data concurrently during a data transfer from another source, such as a storage area network (not shown). In either configuration, during a data transfer, the data to be transferred may be stored temporarily in input buffer 122. The data may be any sequence of one or more bits, and in the present embodiment the data may be a large media file, such as a digital copy of a movie recording.

To initiate a data transfer from media server 110 to 140, transfer monitor 114, executing on processor 112, may first select a communication path. In the present embodiment, there are three communication paths 132, 134, and 136 in packet network 130. Communication paths 132, 134, and 136 may comprise different types of technology; for example communication path 132 may comprise the public Internet via wire lines, communication path 134 may comprise a private intranet, and communication path 136 may comprise a network connection via a wireless connection. Two communication paths may share overlapping segments, like communication paths 132 and 134, or a communication path may be separate from other communication paths, like communication path 136. To make a selection between communication paths 132, 134, and 136, processor 112 may utilize information stored in database 116 by transfer monitor 114.

Database 116 can be a collection of transfer characteristics of prior data transfers. In one embodiment of the present invention, database 116 is implemented as a relational database containing data transfer records related to data transfers that media server 110 has performed in the past. A data transfer record for each communication path may contain transfer characteristic information about, for example, when a data transfer occurred, what the data transfer throughput was, and where the transferred data was sent. Information about the data transfer of one large media file may be contained in one or more data transfer records. Information about the throughput of a data transfer contained in a data transfer record may include average throughput information, minimum and maximum throughput information, packet loss or delay, or other information that characterizes the data transfer performance.

Transfer monitor 114, under control of processor 112, may examine one or more data transfer records in database 116 to select and estimate the performance of a communication path. If data transfer records in database 116 indicate, for example, that communication path 132 usually exhibits low throughput in the morning, but higher throughput in the evening, transfer monitor 114 may delay a data transfer to take advantage of the later increase. Instead of delaying the data transfer, transfer monitor 114 may opt to use communication path 134 or 136, if data transfer records suggest better performance will result.

During the examination of database 116, transfer monitor 114 may also select and alter or configure data transfer algorithms 120 of packetizer 118 to conform to the expected performance of a communication path. For example, if database 116 data transfer records support a selection of communication path 132, but also indicate that communication path 132 exhibits a particular loss characteristic, then data transfer algorithms 120 can be configured to compensate for the loss characteristic prior to initiating a data transfer. For example, data transfer algorithms 120 may be configured to use smaller data packets or a more robust error correction algorithm.

After executing transfer monitor 114 on processor 112 to select a communication path and to configure data transfer algorithms 120 of packetizer 118, media server 110 may initiate a data transfer by executing packetizer 118. During execution on processor 112, packetizer 118 can input data from input buffer 122, prepare the data for transmission, and output the prepared data to output buffer 124. Data preparation may include, for example, dividing the data into a plurality of packets and calculating forward error corrections codes for each packet.

During a data transfer, transfer monitor 114 may continue executing on processor 112 to monitor transfer characteristics and to create new data transfer records for the selected communication path. The newly created data transfer records may be stored immediately in database 116, and may contain information about, for example, when the data transfer is occurring, what the data transfer throughput is, and where the data is being sent to. Information about the throughput of the data transfer contained in the newly created data transfer records may include average throughput information, minimum and maximum throughput information, packet loss or delay, or other information that characterizes the performance of the data transfer.

During a data transfer, transfer monitor 114 may also examine the newly created data transfer records and compare them to previously created data transfer records of the selected communication path and other communication paths in order to improve performance of the present data transfer. For example, based on such comparison, data transfer algorithms 120, executing as part of packetizer 118 on processor 112, may be altered or reconfigured by transfer monitor 114 to conform to the current characteristics of the selected communication path. As another example, newly created data transfer records might suggest to transfer monitor 114 that a data transfer utilizing communication path 132 has begun to exhibit long burst errors. Consequently, transfer monitor 114 can reconfigure data transfer algorithms 120 use a stronger forward error correction technique.

As an alternative to reconfiguring data transfer algorithms 120, transfer monitor 114 may also select a new communication path to improve performance of the present data transfer. For example, if the newly created data transfer records indicate that throughput across communication path 132 has dropped by 20% based on comparison with previous records, transfer monitor 114 may infer that communication path 132 has slowed down, and replace communication path 132 with communication path 134 or 136 if previous records show that communication path 134 or 136 should have a better performance than the present throughput of communication path 132. In addition to selecting a new communication path in reaction to certain findings, transfer monitor 114 may select a new communication path proactively. For example, if data transfer records in database 116 suggest that communication path 132 throughput usually drops significantly during a particular hour of the day, transfer monitor 114 may select communication path 132 for a data transfer until that particular hour, and then select communication path 134 or 136 to complete the data transfer.

If media server 140 is configured as a passive server, media server 140 merely receives the present data transfer from media server 110. Alternatively, media server 140 may be configured to correspond internally to media server 110, in which case media server 140 may receive the present data transfer and generate new data transfer records for storage in an internal database corresponding to database 116. Media server 140 can use the transfer characteristics recorded while receiving the present data transfer when used later to transmit data.

Thus, media server 110 may send data to media server 140 over communication paths 132, 134, and 136 of packet network 130. Transfer monitor 114 of media server 110 may examine data transfer records in database 116 prior to beginning the data transfer in order to set up the data transfer optimally, and may monitor the transfer and generate new data transfer records in order to fine-tune the transfer for anticipated or unanticipated changes. Concurrently, media server 140 may passively receive data, or may generate data transfer records for later use.

Figure 2:
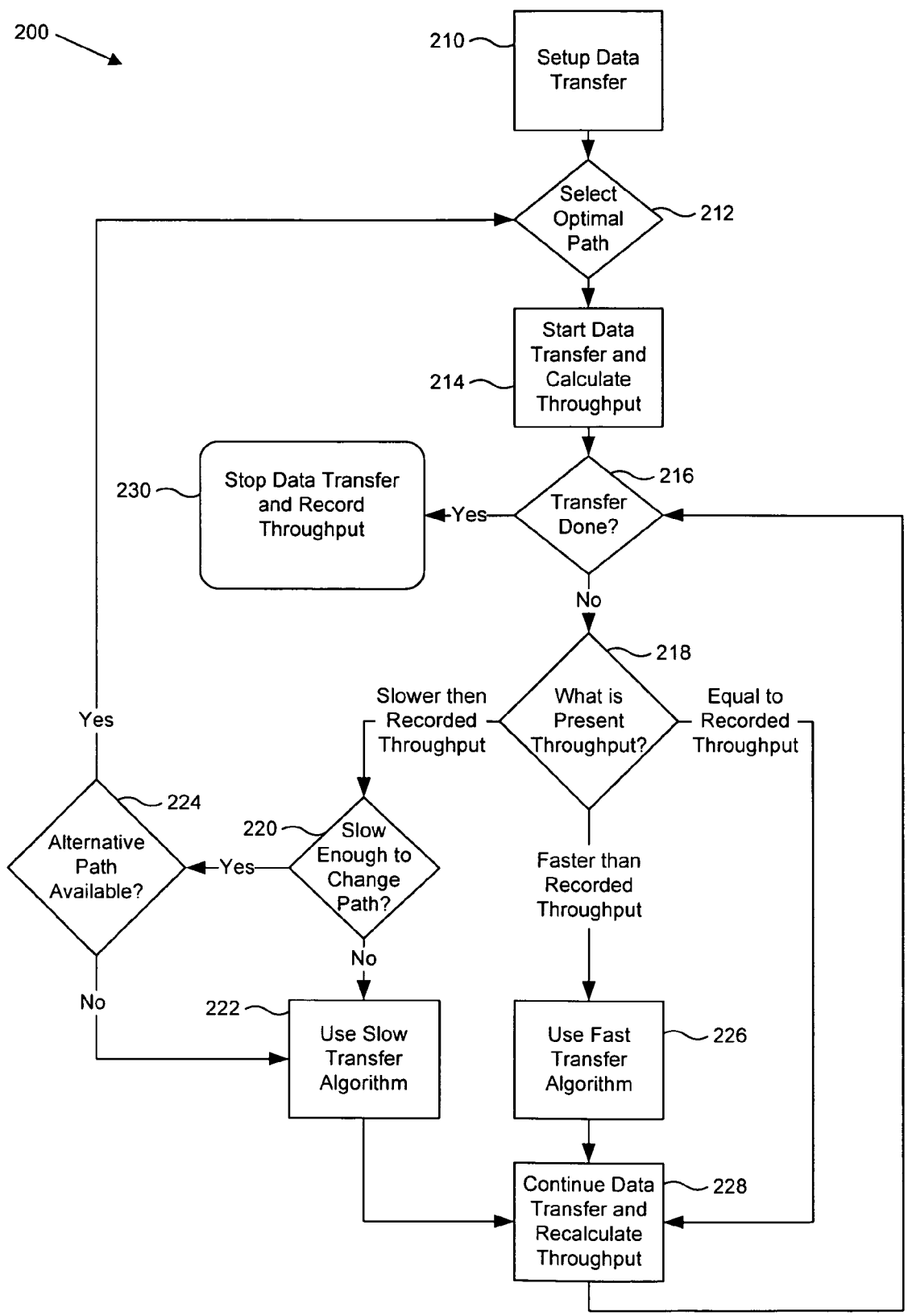
FIG. 2 is a flowchart presenting a method for adaptive data transfer over a packet network, according to one embodiment of the present invention.

FIG. 2 shows flowchart 200 of an exemplary method for use with a media server for adaptive data transfer over a packet network, according to one embodiment of the present invention. Certain details and features have been left out of flowchart 200 that are apparent to a person of ordinary skill in the art. For example, a step may comprise one or more substeps or may involve specialized equipment or materials, as known in the art. While steps 210 through 230 indicated in flowchart 200 are sufficient to describe one embodiment of the present invention, other embodiments of the invention may utilize steps different from those shown in flowchart 200.

In step 210 of flowchart 200, a media server corresponding to media server 110 of FIG. 1 sets up a data transfer to a remote media server corresponding to media server 140. Setting up a data transfer involves, for example, executing software corresponding to transfer monitor 114 for identifying a remote media server to receive the data transfer, for generating a list of presently available communication paths in packet network 130, and for searching a database corresponding to database 116 for data transfer records related to the identified media server and the listed communication paths. In step 212, a presently available communication path from the list assembled in step 210 is selected based on optimization criteria. The selection could be based on which communication path has, for example, the highest lifetime average throughput, the lowest recent loss rate, or the best performance historically during the present time of day.

Continuing with step 214 of flowchart 200, the media server starts a data transfer and begins calculating throughput. To start the data transfer, the media server may execute software corresponding to packetizer 118 to divide the data into two or more packets, calculate forward error-correction codes for the packets, and place the packets in an output buffer corresponding to output buffer 124. As the packets are transferred over the communication path, the media server also calculates throughput by monitoring characteristics such as the rate at which packets are acknowledged by the receiving media server 140, the time interval the communication path is idle between transferring packets, or other characteristics. As the media server calculates throughput, it may record information in data transfer records associated with the selected communication path.

In step 216 of flowchart 200, the media server makes a decision based on whether the data transfer is done. If the data transfer is done, the media server proceeds to step 230, while if the data transfer is not done, the media server proceeds to step 218. In step 230, the media server stops the data transfer and records throughput. To stop the data transfer, the media server may, for example, send a "transfer finished" message to the remote media server, deactivate the data transfer communication path, or perform other cleanup activities. To record throughput, the media server may store the calculated throughput in the form of data transfer records in database 116 or another nonvolatile storage location.

In step 218 of flowchart 200, in contrast with step 230, the data transfer is not done. Previously, in step 214, the media server calculated throughput, and in step 218 the media server compares that calculated throughput with recorded throughput. Recorded throughput may exist in data transfer records in database 116 or another nonvolatile storage solution. The media server, in comparing the calculated throughput with recorded throughput, examines one or more stored data transfer records, and may calculate averages, minimums, maximums, or other characteristics of stored data transfer records. If the calculated throughput is equal to the recorded throughput, the media server will proceed to step 228, but if the calculated throughput is faster or slower than the recorded throughput, the media server will proceed to step 226 or 220, respectively.

In step 228 of flowchart 200, the media server has decided that the calculated throughput is equal to the recorded throughput, and thus continues the data transfer and recalculates the throughput. Continuing the data transfer and recalculating the throughput in step 228 is similar to analogous procedures in step 214. The media server continues a data transfer by, for example, again executing packetizer 118 to divide data from input buffer 122 into two or more packets, to calculate additional error-correction checksums for the packets; and to place the next packet or packets in output buffer 124. As the packets are transferred over the communication path, the media server also recalculates throughput by monitoring transfer characteristics similar to those monitored in step 214. As the media server recalculates throughput, it records information in data transfer records or some other form of storage.

After step 228 of flowchart 200, the media server repeats step 216, and again decides whether the data transfer is done. If the data transfer is done, the media server proceeds finally to step 230, while if the data transfer is not done, the media server proceeds again to step 218.

If, during step 218 of flowchart 200, the calculated throughput is not equal to the recorded throughput, then media server will proceed to step 226 or 220, instead of step 228. The media server will proceed to step 226 if the calculated throughput is faster than the recorded throughput. This condition might occur, for example, if the utilized communication path is experiencing less data traffic from external sources or if the bandwidth of the communication path has been increased after an upgrade. In step 226, the media server improves its performance by executing transfer monitor 114 to alter or reconfigure data transfer algorithms 120 of packetizer 118. Such an alteration may entail, for instance, increasing the length of packets transmitted on the utilized communication path or reducing the use of forward error correction in the utilized communication path. After making such an alteration, the media server proceeds to step 228.

If, during step 218 of flowchart 200, the media server proceeds to step 220 instead of step 226, the calculated throughput is slower than the recorded throughput. This condition might occur, for example, if the utilized communication path is experiencing high data traffic from external sources or if the utilized communication path bandwidth has declined because of equipment failure. In step 220, the media server decides whether to attempt utilizing a different communication path. The media server makes this decision by, for example, comparing the calculated throughput with a threshold minimum throughput. If the calculated throughput is lower than the threshold minimum throughput, the media server will proceed to step 224 and try to utilize a different communication path. In contrast, if the calculated throughput is equal to or higher than the threshold minimum throughput, the media server will proceed to step 222.

In step 222 of flowchart 200, the media server has decided that the calculated throughput is slower than the recorded throughput, but not slow enough to require utilizing a different communication path altogether. This condition might occur, for example, if the utilized communication path is experiencing more data traffic from external sources or if the bandwidth of the communication path has decreased because of equipment failure. In step 222, the media server adapts to the degraded throughput by executing transfer monitor 114 to alter or reconfigure data transfer algorithms 120 of packetizer 118. Such an alteration may entail, for instance, decreasing the length of packets that the media server buffers with the utilized communication path or increasing the use of forward error correction in the utilized communication path. After making such an alteration, the media server proceeds to step 228.

If the media server proceeds to step 224 of flowchart 200 instead of step 222, the calculated throughput is lower than the threshold minimum throughput, and consequently the media server will opt to utilize a different communication path in packet network 130. If the media server cannot discover a different communication path to utilize, then the media server must adapt to the present, slow utilized communication path as best it can, and proceed back to step 222. However, if the media server does have a different communication path to utilize, it proceeds to step 212 to select from the one or more optimal paths that function better than the presently utilized communication path.

Thus, the present application discloses a method and system for adaptive data transfer over a packet network. One embodiment of the system utilizes a transfer monitor executing on a media server to transfer data to a similar system on another media server via one or more communication links. The transfer monitor may comprise a database of data transfer records and an adaptable transfer algorithm that can select between communication links and be reconfigured to accommodate fast or slow communication links.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. It should also be understood that the invention is not limited to the particular embodiments described herein, but is capable of many rearrangements, modifications, and substitutions without departing from the scope of the invention.

What is claimed is:

1. A method for use by a first computer for transferring data to a second computer, the method comprising:
    selecting a first communication path for transferring the data to the second computer based on database information about one or more previously stored data throughput related to one or more prior data transfers during the same time of day in the past;
    starting to transfer the data over the first communication path to the second computer;
    monitoring present data throughput over the first communication path related to the data transfer;
    storing the present data throughput associated with the first communication path in the database;
    comparing the present data throughput against database information about one or more previously stored data throughput related to one or more prior data transfers during the same time of day in the past; and
    altering a transfer algorithm being utilized for transferring the data to the second computer based on the comparing, wherein the altering of the transfer algorithm comprises adjusting the amount of redundancy in a forward error correction mechanism in response to the comparing.

2. The method of claim 1, further comprising determining whether to replace the first communication path with a second communication path for transferring the data to the second computer based on the comparing.

3. The method of claim 1, wherein the first communication path comprises the Internet.

4. The method of claim 1, wherein the first communication path comprises a wireless connection.

5. The method of claim 1, wherein altering the transfer algorithm further comprises adjusting a length of a data segment.

6. The method of claim 1, wherein the first computer is a media server.

7. A system for use by a first computer for transferring data to a second computer over a first communication path, the system comprising:
    a database configured to store one or more previously data throughput related to one or more prior data transfers during different times of day in the past;
    a processor configured to:
        select a first communication path for transferring the data to the second computer based on database information about one or more previously stored data throughput related to one or more prior data transfers during the same time of day in the past;
        start transferring the data over the first communication path to the second computer;
        monitor present data throughput over the first communication path related to the data transfer;
        store the present data throughput associated with the first communication path in the database;
        compare the present data throughput against database information about one or more previously stored data throughput related to one or more prior data transfers during the same time of day in the past; and
        alter a transfer algorithm being utilized for transferring the data to the second computer based on the comparing, wherein altering the transfer algorithm comprises adjusting the amount of redundancy in a forward error correction mechanism in response to the comparing.

8. The system of claim 7, the processor is further configured to determine whether to replace the first communication path with a second communication path.

9. The system of claim 7, wherein the first communication path comprises the Internet.

10. The system of claim 7, wherein the first communication path comprises a wireless connection.

11. The system of claim 7, wherein altering the transfer algorithm further comprises adjusting a length of a data segment.

12. The system of claim 7, wherein the first computer comprises a media server.

13. A method for use by a first computer for transferring data to a second computer, the method comprising:
    selecting a first communication path for transferring the data to the second computer based on database information about one or more previously stored data throughput related to one or more prior data transfers during the same time of day in the past;
    starting to transfer the data over the first communication path to the second computer;
    monitoring present data throughput over the first communication path related to the data transfer;

storing the present data throughput associated with the first communication path in the database;

comparing the present data throughput against database information about one or more previously stored data throughput related to one or more prior data transfers during the same time of day in the past; and altering a transfer algorithm being utilized for transferring the data to the second computer based on the comparing, wherein the altering of the transfer algorithm comprises adjusting a length of a data segment in response to the comparing.

14. The method of claim 13, replacing the first communication path with a second communication path for transferring the data to the second computer based on the comparing.

15. The method of claim 13, wherein the first communication path comprises the Internet.

16. The method of claim 13, wherein the first communication path comprises a wireless connection.

17. The method of claim 13, wherein the first computer is a media server.

* * * * *